(12) United States Patent
Salehie et al.

(10) Patent No.: US 11,276,089 B1
(45) Date of Patent: Mar. 15, 2022

(54) METHOD, APPARATUS, AND COMPUTER PROGRAM PRODUCT FOR ADAPTIVE TAIL DIGITAL CONTENT OBJECT BID VALUE GENERATION

(71) Applicant: Groupon, Inc., Chicago, IL (US)

(72) Inventors: Mazeiar Salehie, Bellevue, WA (US); Clovis Aurius Chapman, Seattle, WA (US)

(73) Assignee: GROUPON, INC., Chicago, IL (US)

( * ) Notice: Subject to any disclaimer, the term of this patent is extended or adjusted under 35 U.S.C. 154(b) by 0 days.

(21) Appl. No.: 16/228,485

(22) Filed: Dec. 20, 2018

Related U.S. Application Data

(60) Provisional application No. 62/608,445, filed on Dec. 20, 2017.

(51) Int. Cl.
*G06Q 30/00* (2012.01)
*G06Q 30/02* (2012.01)
*G06N 20/00* (2019.01)
*G06F 16/28* (2019.01)

(52) U.S. Cl.
CPC ....... *G06Q 30/0275* (2013.01); *G06F 16/285* (2019.01); *G06N 20/00* (2019.01)

(58) Field of Classification Search
CPC ... G06Q 30/0275; G06F 16/285; G06N 20/00
USPC ........................................... 705/14.71
See application file for complete search history.

(56) References Cited

U.S. PATENT DOCUMENTS

| | | |
|---|---|---|
| 2006/0287919 A1 | 12/2006 | Rubens et al. |
| 2007/0143266 A1* | 6/2007 | Tang ............... G06Q 30/02 |
| 2015/0058310 A1* | 2/2015 | Mukherjee ........ G06Q 30/02 |
| | | 707/706 |
| 2015/0186937 A1 | 7/2015 | Lui et al. |
| 2017/0262899 A1* | 9/2017 | Geraghty ............ G06N 5/047 |
| 2017/0262925 A1 | 9/2017 | Rangasamy et al. |

FOREIGN PATENT DOCUMENTS

CA   2504106 C   *   6/2014   .......... G06F 16/951

OTHER PUBLICATIONS

Wiley Encyclopedia of Computer Science (Year: 2009).
Approaches to Machine Learning, P. Langley at Carnegie-Mellon University (Year: 1984).

\* cited by examiner

*Primary Examiner* — Sun M Li
(74) *Attorney, Agent, or Firm* — Alston & Bird LLP

(57) ABSTRACT

Embodiments of the present disclosure provide methods, systems, apparatuses, and computer program products for adaptively generating an electronic bid value for a tail digital content object.

19 Claims, 6 Drawing Sheets

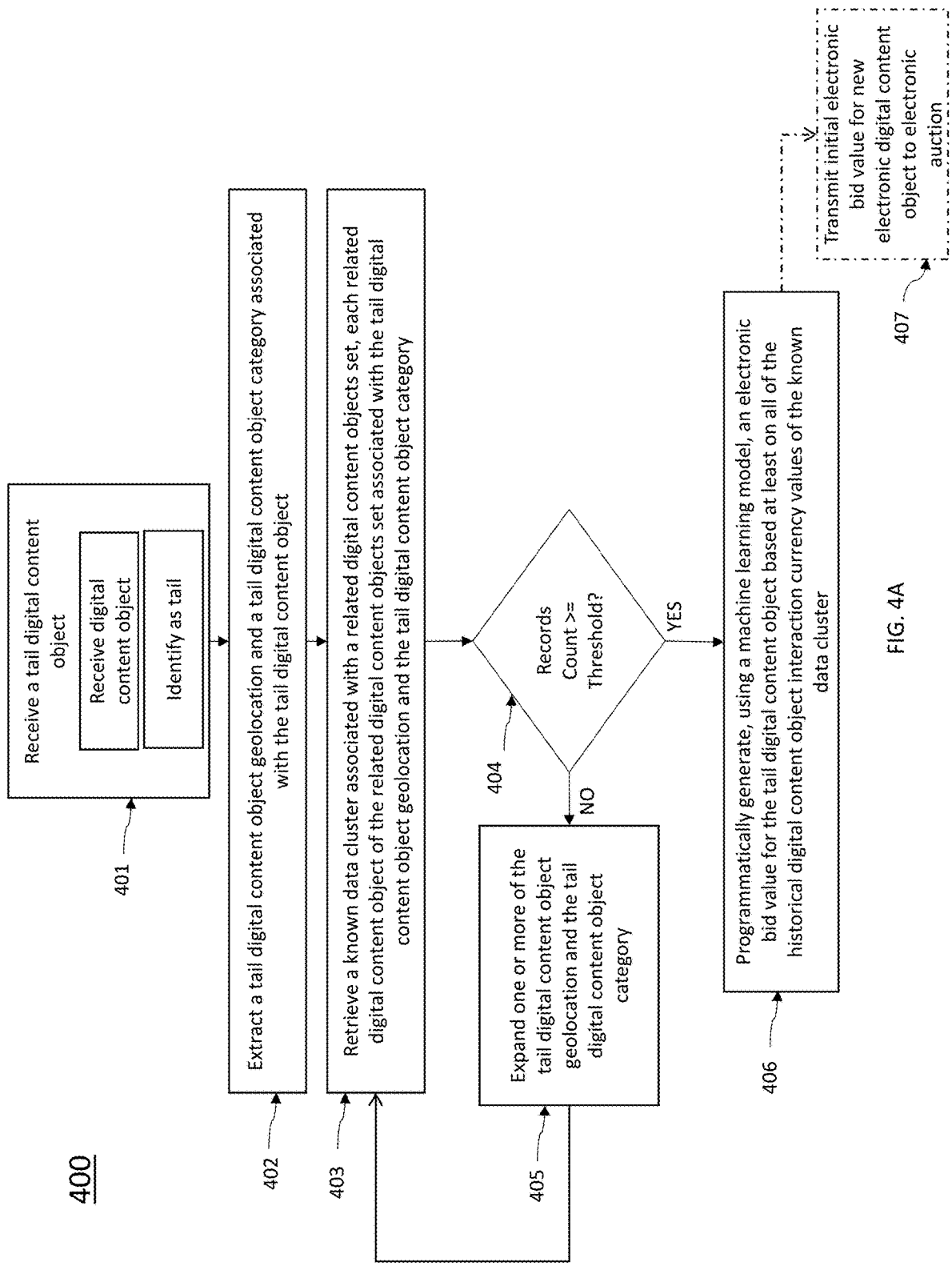

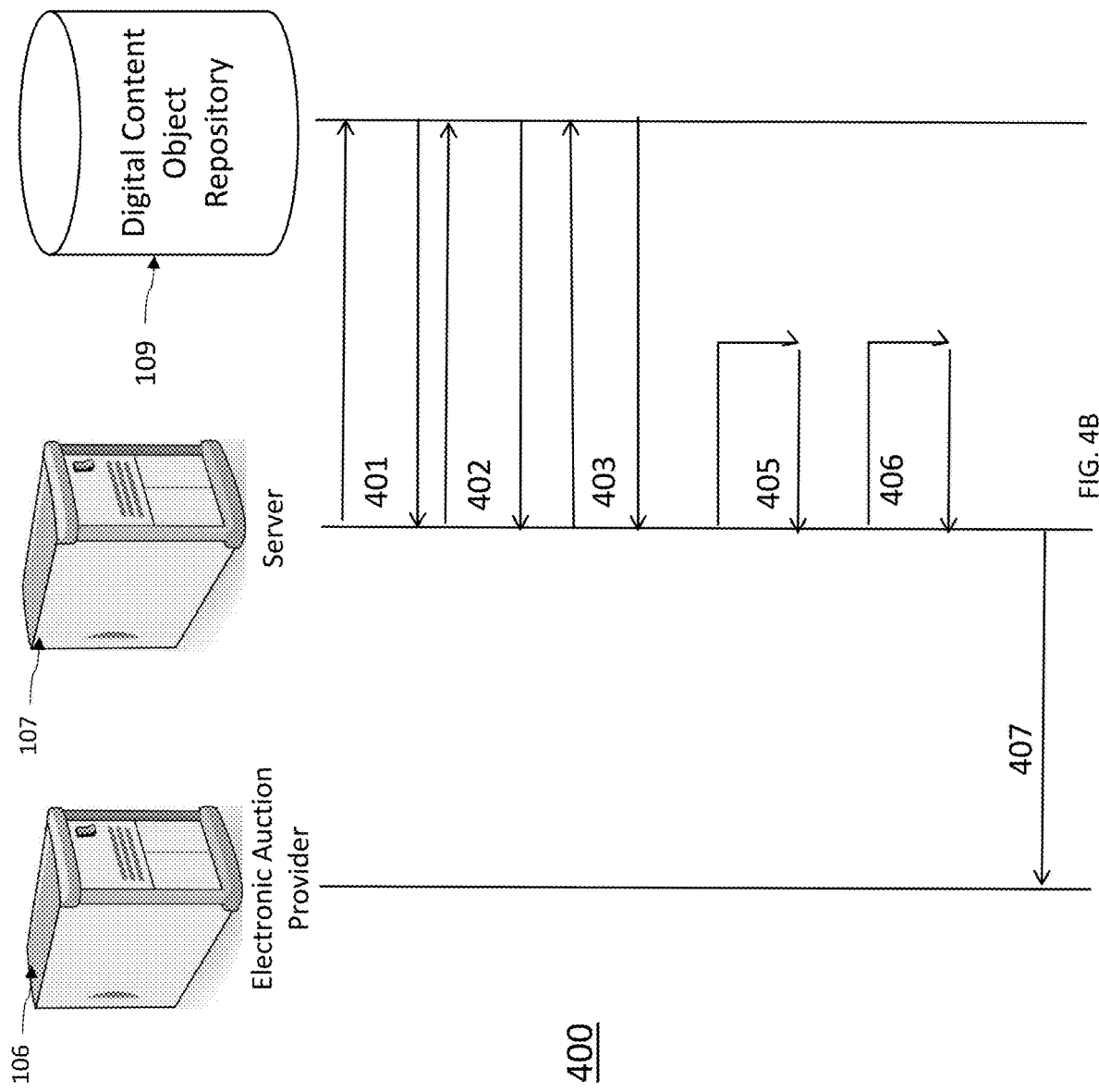

METHOD, APPARATUS, AND COMPUTER PROGRAM PRODUCT FOR ADAPTIVE TAIL DIGITAL CONTENT OBJECT BID VALUE GENERATION

CROSS-REFERENCE TO RELATED APPLICATIONS

The present application claims priority to U.S. Provisional Patent Application Ser. No. 62/608,445, titled "METHOD, APPARATUS, AND COMPUTER PROGRAM PRODUCT FOR ADAPTIVE TAIL DIGITAL CONTENT OBJECT BID VALUE GENERATION," filed Dec. 20, 2017, the contents of which are incorporated herein by reference in their entirety.

BACKGROUND

Generating an electronic bid value for any given keyword so as to improve placement of an electronic advertisement is a difficult and dynamically changing computational challenge. Through applied effort, ingenuity, and innovation, many of these identified problems have been solved by developing solutions that are included in embodiments of the present disclosure, many examples of which are described in detail herein.

BRIEF SUMMARY

This specification relates to adaptively generating an electronic bid value for a tail digital content object. In one embodiment, a computing entity or apparatus is configured to receive the tail digital content object. In embodiments, receiving the tail digital content object comprises receiving a digital content object and determining that it is a tail digital content object.

In embodiments, the computing entity or apparatus is further configured to extract a tail digital content object geolocation and a tail digital content object category associated with the tail digital content object. In embodiments, the computing entity or apparatus is further configured to iteratively retrieve known data clusters until a final known data cluster having a final data records count meeting or exceeding a data counts threshold is retrieved.

In embodiments, iteratively retrieving known data clusters comprises retrieving a known data cluster associated with a related digital content objects set. In embodiments, each related digital content object of the related digital content objects set is associated with the tail digital content object geolocation and the tail digital content object category. In embodiments, the known data cluster comprises a data records count and a historical digital content object interaction currency value for each related digital content object of the related digital content objects set. In embodiments, iteratively retrieving known data clusters further comprises comparing the data records count to a data records count threshold. In embodiments, upon determining that the data records count is less than the data records count threshold, the iteratively retrieving known data clusters further comprises expanding one or more of the tail digital content object category and tail digital content object geolocation and returning to retrieve another known data cluster.

In embodiments, the computing entity or apparatus is further configured to, upon determining that the data records count is equal to or greater than the data records count threshold, transform the known data cluster into the final known data cluster.

In embodiments, the computing entity or apparatus is further configured to programmatically generate, using a machine-learning model, an electronic bid value for the tail digital content object based at least on all of the historical digital content object interaction currency values of the final known data cluster.

In embodiments, the computing entity or apparatus is further configured to determine whether to expand one or more of the tail digital content object geolocation and the tail digital content object category dynamically using machine-learning.

In embodiments, the data records count is a count of digital content object interactions having digital content object currency values associated therewith.

In embodiments, the tail digital content object is a keyword.

In embodiments, the keyword is associated with a digital content object interaction threshold.

In embodiments, the machine-learning model is a clustering function.

In embodiments, the digital content object interaction threshold is programmatically generated based at least on known digital content object interactions associated with the keyword within a predetermined network time period.

In embodiments, the electronic bid value is for transmission to a search engine marketing electronic auction. In embodiments, the electronic bid values is for transmission to a display network auction.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Figure 1:
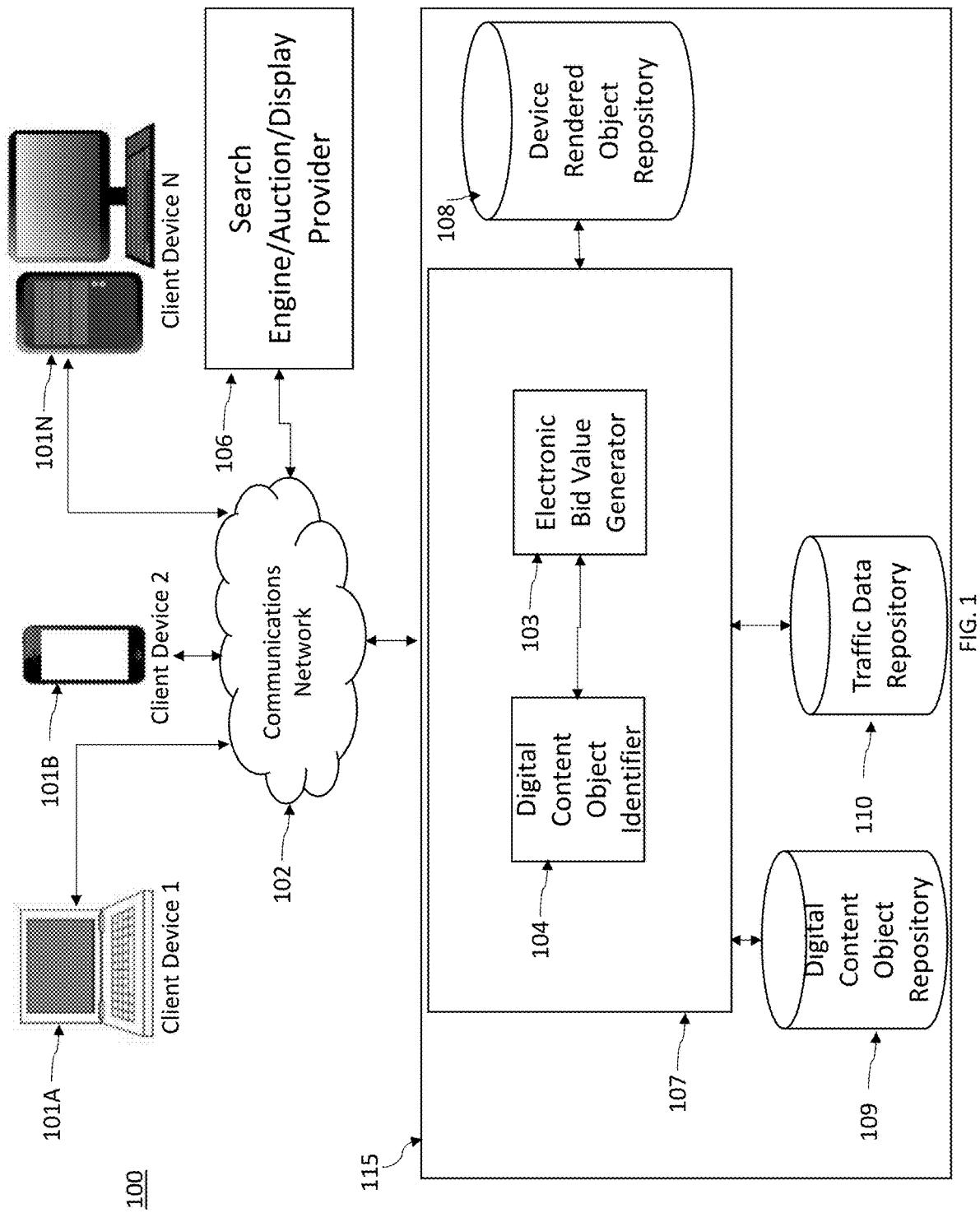
Figure 2:
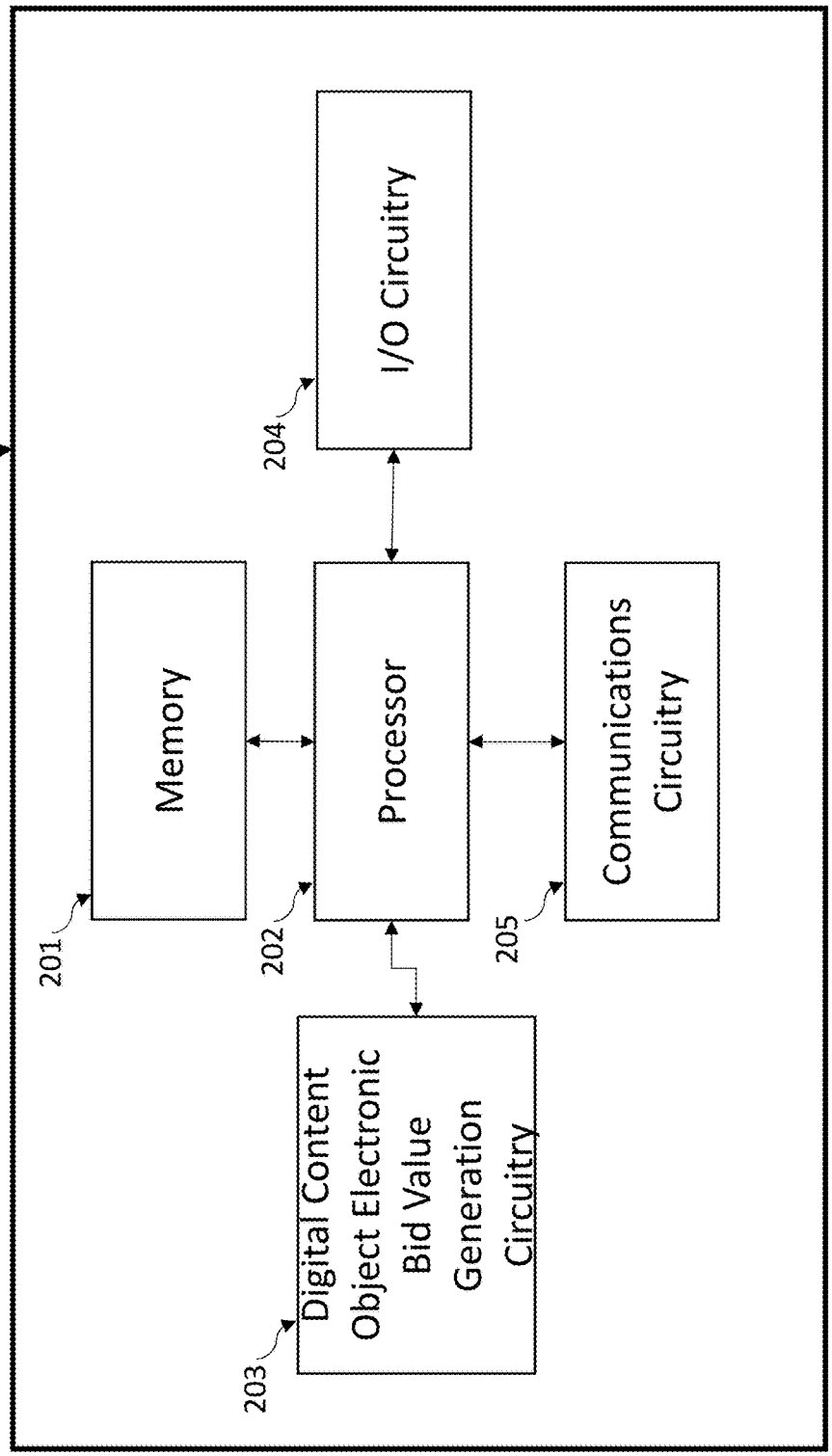
Figure 3A:
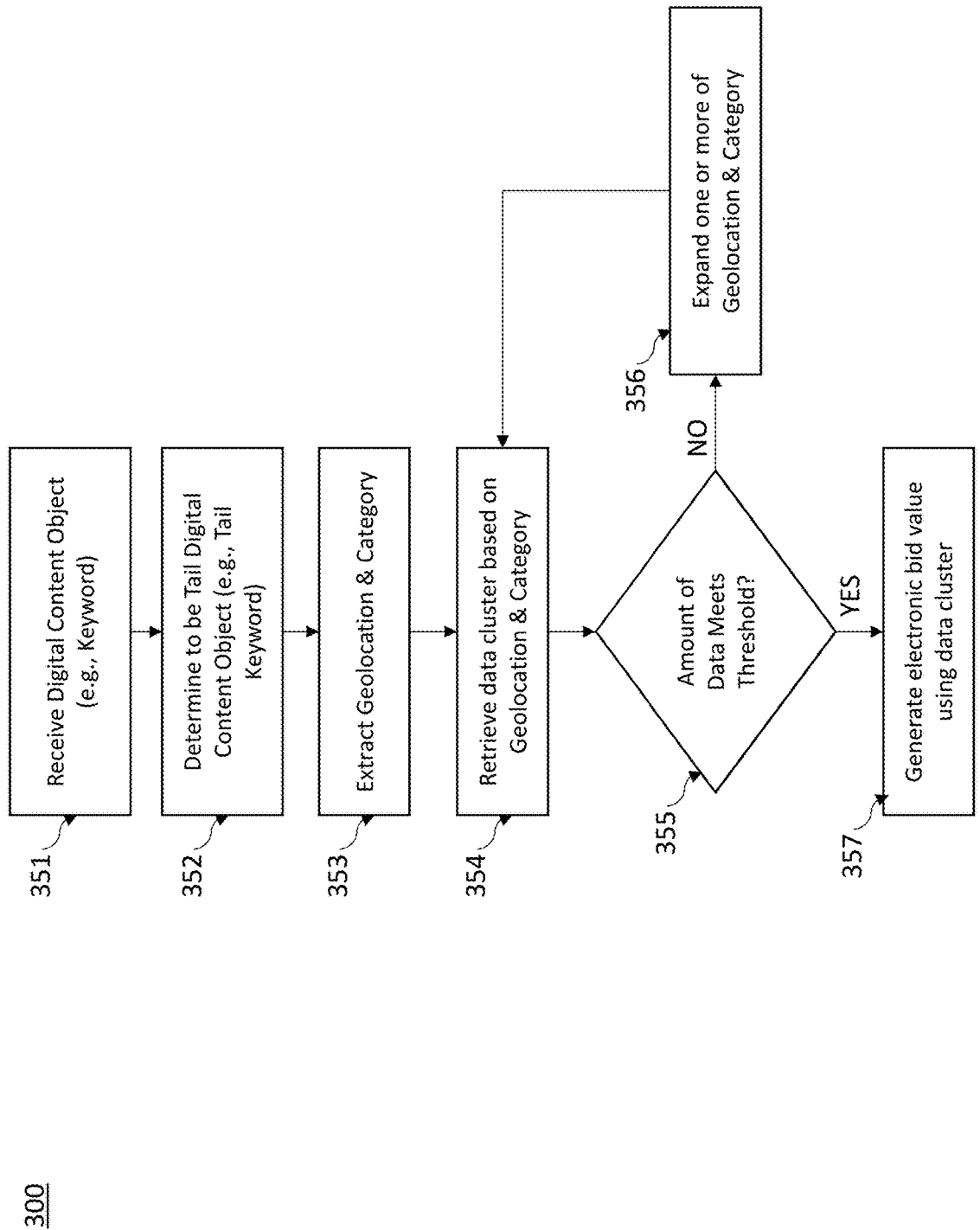
Figure 3B:
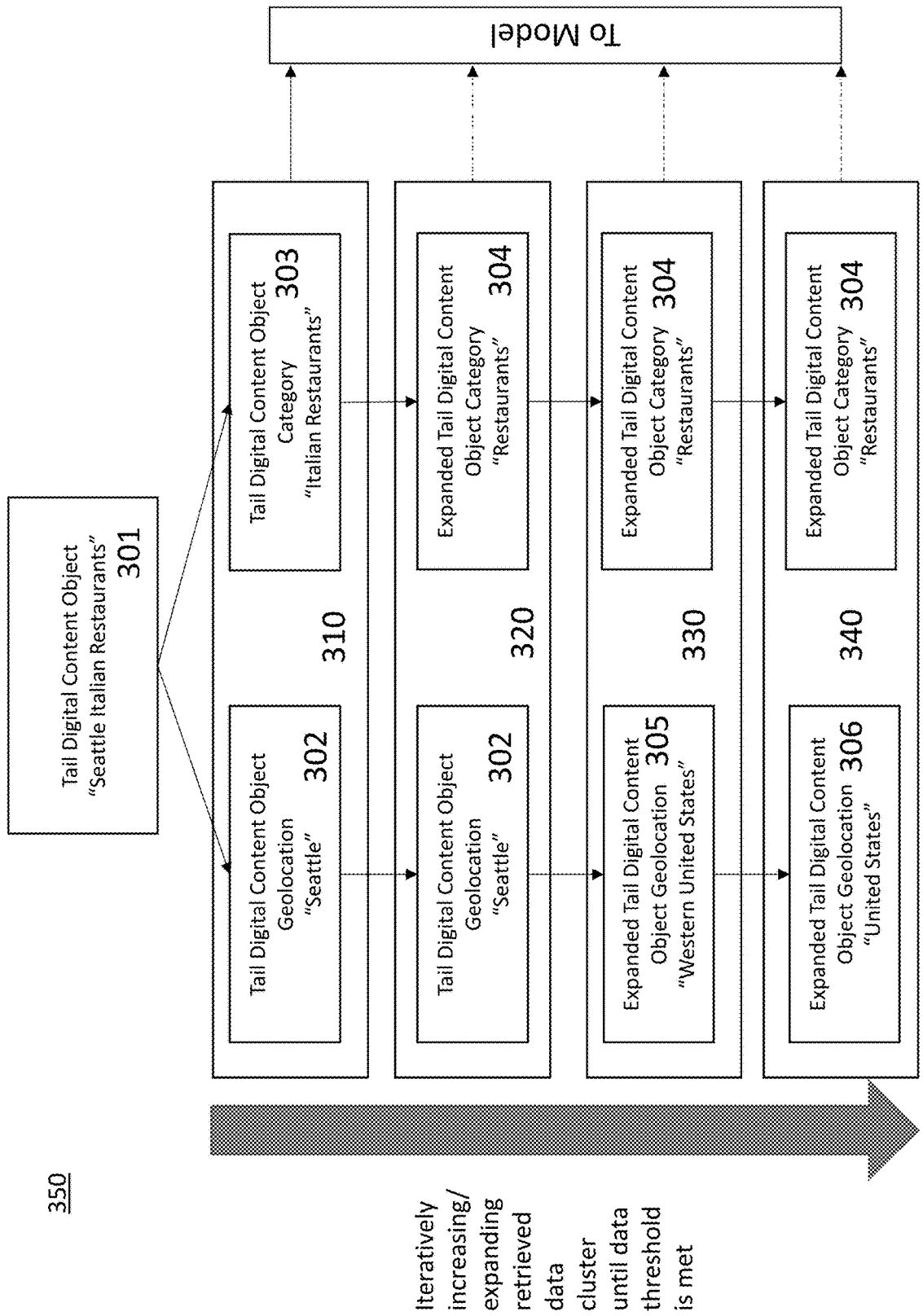

Having thus described the disclosure in general terms, reference will now be made to the accompanying drawings, which are not necessarily drawn to scale, and wherein:

FIG. 1 is a system architecture diagram of a system configured to practice embodiments of the present disclosure;

FIG. 2 is an exemplary schematic diagram of a computing entity according to one embodiment of the present disclosure;

FIG. 3A illustrates an exemplary electronic bid value generation data flow for use with embodiments of the present disclosure;

FIG. 3B illustrates an exemplary electronic bid value generation data flow for use with embodiments of the present disclosure;

FIG. 4A illustrates an exemplary electronic bid value generation process for use with embodiments of the present disclosure; and FIG. 4B illustrates an exemplary electronic bid value generation process for use with embodiments of the present disclosure.

DETAILED DESCRIPTION OF VARIOUS EMBODIMENTS

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

Various embodiments of the disclosure generally relate to dynamically generating an electronic bid value for a digital content object. For example, the methods, apparatus and computer program products described herein are operable to receive a tail digital content object and to extract a tail digital content object geolocation and a tail digital content object category associated with the tail digital content object. In embodiments, the computing entity or apparatus is further configured to iteratively retrieve known data clusters until a final known data cluster having a final data records count meeting or exceeding a data counts threshold is retrieved.

In embodiments, the computing entity or apparatus is further configured to programmatically generate, using a machine-learning model, an electronic bid value for the tail digital content object based at least on all of the historical digital content object interaction currency values of the final known data cluster.

An electronic bid value for a digital content object submitted to a search engine electronic auction or display network auction can have a dramatic impact on a lifetime of the digital content object and/or any associated or related device rendered objects (e.g., computing resources dedicated to inventory of device rendered objects). Having sufficient data based upon which an electronic bid value can be generated is a significant challenge for those digital content objects having little or no known data associated therewith (i.e., tail digital content objects). Programmatically generating an electronic bid value for the tail digital content object without having historical data to consult proves detrimental to the success of a campaign related to the tail digital content object. Waiting for enough historical data upon which to base a programmatically generated electronic bid value leads to a waste of computing resources (e.g., storage, processing power, processing time), as does programmatically generating an incorrect or sub-optimal programmatically generated electronic bid value using what little historical data is available (if any).

The inventors have identified that the system resources and time allocated to such electronic bid value generations are easily exhausted and compromised as a result of these challenges. The inventors have determined that the ability to predictively generate an electronic bid value for a tail digital content object, using machine-learning (i.e., a predictive model) and based upon historical data known about related digital content objects, would reduce the computing resources and time necessary to perform such generations or selections.

Definitions

As used herein, the terms "data," "content," "information," "digital content object," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

As used herein, the terms "user," "client," "consumer," and "customer" may be used interchangeably to refer, without limitation, to a client, customer, purchaser, shopper, user and the like who may be using a client device to receive and interact with a device rendered object.

The terms "client profile" or "user profile" refer to a collection of preferences, settings, configurations, client device identifiers, data, and information associated with a specific user. A profile refers therefore to the explicit digital representation of a person's identity and other data or information associated with the user. In some embodiments, a client profile can be used to store a description of characteristics of the user and/or of the client device, as well as credentials, past behaviors, and preferences of the user.

The term "search query" refers to a query for electronic documents or digital content items submitted to a platform by a user utilizing a client device. The term "search results" refers to results returned from such a query. In some examples, a user using the client device may submit a query for "Japanese food" into an interface and the system may return a list of device rendered objects and/or URLs having keywords, metadata, or the like contained therein or associated therewith. The search results thus include the returned list of device rendered objects, all keywords and metadata associated therewith, and an arrangement or ranked order of the returned list.

The term "device rendered object" may be used to refer to a set of executable instructions that, when executed by a processor of a computing device, renders an object for display. An example of a device rendered object can be an instrument of a promotion. The instrument may be any type of gift card, tender, electronic certificate, medium of exchange, voucher, or the like that embodies terms of a promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value, and/or a residual value. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiration or other violation of a redemption parameter, the return or exchange value of the instrument and/or the like.

In the present embodiments, device rendered objects may have associated therewith one or more attributes. It should be understood that each of the attributes discussed in this application, may be in some embodiments a primary or a secondary attribute. A list of exemplary attributes is provided below.

In the present embodiments, digital content objects may have associated therewith one or more attributes. It should be understood that each of the attributes discussed in this application, may be in some embodiments a primary or a secondary attribute. A list of exemplary attributes is provided below.

In some implementations, one attribute may represent category data, specifically beauty, wellness and healthcare. To determine a normalized value of the one attribute, an algorithm may be executed on associated raw data related to a device rendered object transaction. For example, if the category data associated with a device rendered object transaction is "beauty, wellness and healthcare," the value of the one attribute is 1. If the category data associated with a device rendered object transaction is not "beauty, wellness and healthcare," the value of the one attribute is 0.

In some embodiments, a number of example attributes relate to category data and sub-category data. There are also a number of attributes related to location data. It should be understood that attribute data related to location and hyper location data may be generated in a similar fashion. For example, if the location data associated with a device rendered object transaction is "Chicago," the value of a corresponding attribute may be 1. If the category data associated with a device rendered object transaction is not "Chicago," the value of the corresponding attribute may be 0.

It should also be understood that device rendered object transactions and digital content object transactions may have associated data indicating one or more categories, sub-categories, location, hyper-locations, prices or the like. For example, a device rendered object transaction may be associated with a gym, and the gym may be associated with category data such as "beauty, wellness, and healthcare," "Food and drink," "Leisure Offers and Activities" and/or "Services." A gym may also have more than one location, and may be able to provide promotions in a variety of price ranges and time frames.

Example attribute data can also be associated with review websites such as Yelp®, Google®, Yahoo®, City Search®, Trip Advisor®. It should be understood that any review website could have associated attribute data, such as for example Zagat®, Bing® or the like. It should also be understood that attribute data associated with reviews related to one or more categories may be generated. For example, a website may provide reviews related to a provider's food, service, décor, price or the like. Attribute data may be generated related to each of one or more categories, such as a provider's food, service, décor, price, or the like.

It should also be understood that a location, hyper-location, category or sub-category may affect data available for the provider of a promotional transaction. For example, device rendered object transactions purchased from providers from different locations (e.g., different countries, states, neighborhoods or the like) may be associated with different attribute data. For example, different countries have different credit reporting rules and agencies. Thus, a promotion and marketing system may utilize a first combination of attributes for a device rendered object transaction from a provider in a first location, hyper-location, category or sub-category and a second combination of attributes for a device rendered object transaction from provider in a second location, hyper-location, category or sub-category.

In one implementation, other attribute data may be used. For example, attribute "bad month" may relate to identifying device rendered object transactions associated with booking months where prior device rendered object transactions have involved products, services, and/or other offerings in one or more categories categorized as having high return rates based on prior performance data. The feature may be normalized such that if the sub-category of the device rendered object transaction is associated with high return rates, the attribute is 1, else the attribute is 0. Other example attributes are "bad market," which may be normalized such that if the device rendered object transaction requires travel to a location and/or hyper local region associated with high return rates, the attribute is 1, else the attribute is 0. Another example feature is "average price for sub-category."

Similar attributes may be clustered, grouped, or aggregated. For example, attributes associated with locations or location based attributes may be grouped under header attribute "location." For example, a division attributes specifying a division where the promotion is offered and an attribute specifying a distance from a center of a city where a promotion is offered may be clustered under the location header attribute. Similarly, attributes associated with "past performance," "category & service," "completion," "maximum capacity," "hero score," "review data" may each also be clustered and/or grouped under header attributes. For example, with respect to device rendered object transaction associated with a merchant providing a service, attributes specifying past performance data can be for (1) the same merchant and the same service, (2) only the same merchant, (3) only the same service may be clustered under attribute header "past performance." Table A shows example attributes.

TABLE A

| Type | Features |
| --- | --- |
| Location | division, distance to city, etc. |
| past performance | same merchant & service, same service, same merchant, etc. |
| category & service | service header, primary deal service, etc. |
| booking month | holiday, pre-holiday, etc. |
| maximum capacity | units_avail, etc. |
| hero score | predicted 30 day bookings, predicted 60 day bookings, etc. |
| review data | yelp_n_review, yelp_rating, yelp_avil, google_n_review, facebook_fans, etc. |

The clustered or the non-clustered attributes may be used to train a machine-learning model. It should be understood that the selection of attributes or clusters of attributes for training machine-learning models can greatly affect the model performance. In some implementations, attributes and/or clusters of attributes are selected based on statistical analysis. In some implementations, selection of the most significant attributes is based on one or more different attribute selection approaches. These approaches may be (1) forward selection, which is starting with the most significant attributes and incrementally adding a next significant attribute until the model is stable; (2) backward elimination, which starts with all the attributes and exclude the non-significant attributes one by one until the model is stable; (3) a combination of forward selection and backward elimination; and (4) checking the significance of the attribute by statistical model (regression). In one embodiment, each attribute selection approach may give a subset of significant attributes. The attributes that are not shown to be significant by one or more of the attribute selection approaches may be excluded from the model.

The term "clustering function" refers to a machine-learning task. In embodiments, clusters of the clustering function are generated based upon geolocation attributes (defined above), taxonomy category levels (defined above), and aggregated number of electronic interactions with digital content objects (i.e., number of clicks). In embodiments, various combinations of geolocation and category are examined to identify an adequate number of aggregated clicks for a particular evaluation for selecting an electronic bid value. Clusters can be based on each geolocation or group of geolocations (e.g., a city or a group of cities), divisions or even countries, and are dynamically defined in each evaluation of electronic bid values. In embodiments, identifying a combination of geolocation and category with an adequate number of aggregated clicks can be selected based upon recent known evaluations.

The term "machine-learning model" refers to a machine-learning task. Machine-learning is a method used to devise complex models and algorithms that lend themselves to prediction. A machine-learning model is a computer-implemented algorithm that can learn from data without relying on rules-based programming. These models enable reliable, repeatable decisions and results and uncovering of hidden insights through machine-based learning from historical relationships and trends in the data.

A machine-learning model is initially fit or trained on a training dataset (e.g., a set of examples used to fit the parameters of the model). The model can be trained on the training dataset using supervised or unsupervised learning. The model is run with the training dataset and produces a result, which is then compared with a target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g. the number of hidden units in a neural network). In some embodiments, the machine-learning model is a regression model.

The terms "dataset" and "data set" refer to a collection of data. A data set can correspond to the contents of a single database table, or a single statistical data matrix, where every column of the table represents a particular variable, and each row corresponds to a given member of the data set in question. The data set can be comprised of tuples.

As used herein, the term "keyword" refers to a search term, word, or phrase that are selected to be rendered as part of a search engine results interface displayed on a graphical user interface of a client device. Content related to the search terms, words, or phrases are rendered for display to a user using a client device whenever the user enters the keyword into a search engine interface (e.g. Google, Bing, Yahoo, Baidu, and the like) via the client device. The keyword may describe or be associated with device rendered objects provided by a device rendered object service. The keyword may be selected by the device rendered object service as a digital content object for which to submit an electronic bid value for search engine marketing to help determine when and where content provided by the device rendered object service may appear on a search engine results page displayed on a graphical user interface for a user using a client device.

As used herein, the term "electronic bid value" refers to a digital representation of an amount of currency a device rendered object service is willing to have deducted from a currency account for a keyword each time a user searches the keyword as described above and interacts, via a client device, with content provided by the device rendered object service that is associated with the keyword. In embodiments, the digital content provided by the device rendered object service is an electronic advertisement.

The term "digital content object interaction" refers to electronic interaction with a digital content object by a client device. In some examples, the digital content object interaction may take the form of an accessing or selection of the digital content object, and/or the like.

In some embodiments, the interaction data (e.g., digital content object interaction data) may include various other interactions, including without limitation, mouse-over events and durations, the amount of time spent by the client device viewing particular content, the rate at which impressions of particular content result in sales associated with that content, demographic information associated with each particular client using the client device, data indicating other content accessed by the client device (e.g., browser cookie data), the time or date on which content was accessed, the frequency of impressions for particular content, associations between particular clients or client demographics and particular impressions, and/or the like.

The term "search engine electronic advertisement" refers to a digital advertisement for placement on a search engine page. In embodiments, a search engine electronic advertisement has associated therewith one or more digital content objects. In embodiments, a search engine electronic advertisement maybe associated with a particular digital content object according to a certain match type (defined below) and/or according to a certain campaign type (defined below).

The term "display network electronic advertisement" refers to a digital advertisement for placement on an interface (e.g., webpage) associated with a particular display network provider. In embodiments, a display network electronic advertisement has associated therewith one or more digital content objects. In embodiments, a display network electronic advertisement maybe associated with a particular digital content object according to a certain match type (defined below) and/or according to a certain campaign type (defined below).

As used herein, the term "device rendered object service" may include a service that is accessible via one or more computing devices and that is operable to provide device rendered object services on behalf of one or more providers that are offering one or more instruments that are redeemable for goods, services, experiences and/or the like. In some examples, the device rendered object service may take the form of a redemption authority, a payment processor, a rewards provider, an entity in a financial network, a promoter, an agent and/or the like. As such, the device rendered object service is, in some example embodiments, configured to present one or more device rendered objects (e.g., promotions) to client devices, accept payments for device rendered objects from client devices, issue instruments upon acceptance of an object, participate in redemption, generate rewards, provide a point of sale device or service, issue payments to providers and/or otherwise participate in the exchange of goods, services or experiences for currency, value and/or the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of providing a good, service or experience to a consumer, facilitating the provision of a good service or experience to a consumer and/or otherwise operating in the stream of commerce. The "provider" or "merchant" need not actually market a product or service via the device rendered object service, as some merchants or providers may utilize the device rendered object service only for the purpose of gathering client profile information, vector activity information, similarity table information, or the like.

The term "device rendered object interaction" refers to electronic interaction with a device rendered object by a client device. In some examples, the device rendered object interaction may take the form of an accessing or selection of the device rendered object, a viewing of the device rendered object on an electronic display, a scrolling over the device rendered object, a retrieval of the device rendered object, a purchase transaction completed for the device rendered object, and/or the like.

In some embodiments, the interaction data (e.g., device rendered object interaction data) may include various other interactions, including without limitation, mouse-over events and durations, the amount of time spent by the client device viewing particular content, the rate at which impressions of particular content result in sales associated with that content, demographic information associated with each particular client using the client device, data indicating other content accessed by the client device (e.g., browser cookie data), the time or date on which content was accessed, the frequency of impressions for particular content, associations between particular clients or client demographics and particular impressions, and/or the like.

The term "device rendered object interaction signal" refers to electronic indication that an interaction as defined above has occurred with respect to a particular device rendered object.

It should be appreciated that the term "programmatically expected" indicates machine prediction of occurrence of certain events. For example, a "programmatically expected" number of device rendered object interactions by a first user associated with a client device is a number determined by machine prediction specifying the expected number of device rendered object interactions that will be performed by the first user associated with the client device.

As used herein, the term "likelihood" refers to a measure of probability for occurrence of a particular event. For example, the likelihood that a client device will interact with a device rendered object may be a value associated with a specific scale. In some implementations, the machine predictions discussed above are based, at least in part, on the "likelihood" that an event will occur.

The term "related digital content object" refers to a digital content object having one or more attributes in common with another digital content object. For example, a first digital content object may have associated therewith a particular geolocation. A second digital content object may be found to be related to the first digital content object if it has associated therewith the same geolocation. It will be appreciated that the attributes need not be exactly in common, the attributes themselves may simply be considered related in order to find two related digital content objects. By way of further example, a first keyword may be associated with a geolocation defined as "Seattle," while a second keyword may be associated with a geolocation defined as "Western United States." Because the second geolocation may encompass the first geolocation, the first keyword and second keyword may be found to be related to one another.

The term "tail digital content object" refers to a digital content object that a user may enter into a search engine that is associated with a conversion probability that is below a conversion threshold. Conversion associated with a digital content object, in the context of this application, refers to completion of a network transaction with a device rendered object presented by a device rendered object service as a result of a user searching for and interacting with an electronic advertisement associated with the digital content object.

The term "tail digital content object geolocation" refers to a physical location associated with a tail digital content object.

The term "tail digital content object category" refers to a category associated with a tail digital content object."

The term "tail digital content object attribute" refers to one or more attributes associated with a tail digital content object.

The term "digital content object interaction currency value" refers to a currency value associated with any time a client device interacts with a digital content object. As an example, a digital content object (e.g., a keyword) may have associated therewith an interaction currency value (e.g., revenue per click).

The term "known data" refers to data in a repository that is associated with historical interactions with digital content objects and device rendered objects.

The term "known data cluster" refers to a set of known data that is clustered according to embodiments described herein.

The term "data record" refers to a data structure containing at least a variable and an associated value of the variable. In some embodiments, a data record contains known data about interactions with digital content objects and/or device rendered objects. In some embodiments, a data record also contains known data about a digital content object interaction currency value associated with digital content objects.

The term "data records count" refers to a count of a number of data records contained within a given data set or data cluster.

The term "data records count threshold" refers to a minimum number of data records that must be contained within a given data set or data cluster to be statistically meaningful and appropriate for input to a machine-learning model.

The term "expanded tail digital content object geolocation" refers to a geolocation that is larger than a tail digital content object geolocation. For example, if a tail digital content object geolocation is "Seattle," an expanded tail digital content object geolocation may be defined as "Western United States."

The term "expanded tail digital content object category" refers to a category that is more broad than a tail digital content object category. For example, if a tail digital content object category is "Italian Restaurants," an expanded tail digital content object category may be defined as "Restaurants."

The term "conversion" refers to completion of a network transaction with a device rendered object presented by a device rendered object service as a result of a user searching for and interacting with electronic advertising content associated with a particular digital content object.

The term "head digital content object" refers to a digital content object associated with a conversion probability that exceeds the conversion probability threshold.

The term "network time period" refers to a duration of network time having a beginning timestamp and an ending timestamp.

The term "search engine marketing electronic auction" refers to an electronic auction whereby a search engine provider allows for providers such as a device rendered object service to identify digital content objects for which they will transfer a currency value to the search engine provider. When a client device searches for something on a search engine, the search engine provider reviews the pool of currency value offers for digital content objects deemed relevant to the search and enables an auction.

The term "digital content object campaign type" refers to an electronic display campaign type associated with a digital content object. For example, a digital content object (e.g., a keyword) may be associated with a campaign type (e.g., geolocation, deal, category based advertisements, coupon, discount, root, voucher). It will be appreciated that a particular digital content object may be related to several different campaign types.

The term "electronic display network auction" refers to an electronic auction whereby an electronic display network provider allows for providers such as a device rendered object service to identify digital content objects for which they will transfer a currency value to the electronic display network provider.

It should be appreciated that the term "subset" describes a proper subset. A proper subset of set is portion of the set that is not equal to the set. For example, if elements A, B, and C belong to a first set, a subset including elements A and B is a proper subset of the first set. However, a subset including elements A, B, and C is not a proper subset of the first set.

Example System Architecture

Methods, apparatuses, and computer program products of the present disclosure may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system within which embodiments of the present disclosure may operate. Client devices may access a device rendered object system 115 via a communications network 104 (e.g., the Internet, LAN, WAN, or the like) using client devices 101A-101N. The device rendered object system 115 may comprise a server 107 in communication with one or more databases or repositories 108, 109, 110. The device rendered object system 115 and the client devices 101A-101N may also access and/or communicate with a search engine provider 106 via communications network 104.

The server 107 may be embodied as a computer or computers as known in the art. The server 107 may provide for receiving of electronic data from various sources, including but not necessarily limited to the client devices 101A-101N. For example, the server 107 may be operable to receive and process device rendered object requests and transactions provided by the client devices 101A-101N.

The databases or repositories 108-111 may be embodied as a data storage device such as a Network Attached Storage (NAS) device or devices, or as a separate database server or servers. The databases 108-111 include information accessed and stored by the server 107 to facilitate the operations of the device rendered object system 115. For example, the databases 108-111 may include, without limitation, client profiles for users of the system 115, traffic data, digital content objects and associated features/attributes, device rendered objects and associated features/attributes, and the like.

The server 107 may comprise a digital content object identifier 104 that is configured to identify a digital content object as either a tail digital content object or a head digital content object as defined above. The server 107 may further comprise an electronic bid value generator 103 for generating electronic bid values for digital content objects.

The client devices 101A-101N may be any computing device as defined above. Electronic data received by the server 107 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smart phone or tablet, the client device 101A-101N may execute an "app" to interact with the system 115. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the system 115 and/or the search engine provider 106 via a web browser. As yet another example, the client device 101A-101N may include various hardware or firmware designed to interface with the system 115 and/or the search engine provider 106.

Example Apparatus for Implementing Embodiments of the Present Disclosure

The server 107 may be embodied by one or more computing systems, such as apparatus 200 shown in FIG. 2. The apparatus 200 may include a processor 202, a memory 201, input/output circuitry 204, communications circuitry 205, and digital content object electronic bid value generation circuitry 203. The apparatus 200 may be configured to execute the operations described herein. Although these components 201-205 are described with respect to functional limitations, it should be understood that the particular implementations necessarily include the use of particular hardware. It should also be understood that certain of these components 201-205 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 204 that may, in turn, be in communication with processor 202 to provide output to the user and, in some embodiments, to receive an indication of a user input. The input/output circuitry 204 may comprise a user interface and may include a display and may comprise a web user interface, a mobile application, a client device, a kiosk, or the like. In some embodiments, the input/output circuitry 204 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

Digital content object electronic bid value generation circuitry 203 includes hardware configured to generate electronic bid values for digital content objects. The digital content object electronic bid value generation circuitry 203 may utilize processing circuitry, such as the processor 202, to perform these actions. It should also be appreciated that, in some embodiments, the digital content object electronic bid value generation circuitry 203 may include a separate processor, specially configured field programmable gate array (FPGA), or application specific interface circuit (ASIC). The digital content object electronic bid value generation circuitry 203 may be implemented using hardware components of the apparatus configured by either hardware or software for implementing the functions described herein.

As will be appreciated, any such computer program instructions and/or other type of code may be loaded onto a computer, processor or other programmable apparatus's circuitry to produce a machine, such that the computer, processor or other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Processes for Adaptively Generating Electronic Bid Values for Digital Content Objects FIG. 3A illustrates an exemplary electronic bid value generation data flow for use with embodiments of the present disclosure. In embodiments, an exemplary process 300 begins with receiving a digital content object, such as a keyword 351. In embodiments, process 300 continues with determining that the digital content object is a tail digital content object 352 (e.g., a tail keyword). In embodiments, process 300 continues with extracting a geolocation and a category for the tail keyword 353. In embodiments, process 300 continues with retrieving a cluster of known data based on the extracted geolocation and category. In embodiments, process 300 continues with evaluating 355 whether the data cluster contains a sufficient amount of data for using a machine-learning model to generate an electronic bid value for the digital content object. If there is a sufficient amount of data, an electronic bid value for the digital content object is generated using the data cluster 357. Otherwise, if there is not a sufficient amount of data, one or more of the geolocation and category are expanded 356 and larger data clusters are retrieved 354 iteratively until there is a sufficient amount of data 355 to generate an electronic bid value based on the data cluster 357.

FIG. 3B illustrates an exemplary electronic bid value generation data flow for use with embodiments of the present disclosure. In one example, a tail device rendered object is received, where the tail device rendered object is, for example, "Seattle Italian Restaurants" 301. The tail digital content object geolocation 302 is extracted to be, for example, "Seattle." The tail digital content object category 303 is extracted to be, for example, "Italian Restaurants." In embodiments, a first cluster of known data 310 is retrieved based on the tail digital content object geolocation 302 and the tail digital content object category 303. If the first cluster of known data 310 does not contain a sufficient amount of data, an expanded tail digital content object category 304 of "Restaurants" is used.

A second cluster of known data 320 is retrieved based on the expanded tail digital content object category 304 and the tail digital content object geolocation 302. If the second cluster of known data 320 does not contain a sufficient amount of data, an expanded tail digital content object geolocation 305 of "Western United States" is used.

A third cluster of known data 330 is retrieved based on the expanded tail digital content object category 304 and the expanded tail digital content object geolocation 305. If the third cluster of known data 330 does not contain a sufficient amount of data, a further expanded tail digital content object geolocation 306 of "United States" is used.

A fourth cluster of known data 340 is retrieved based on the expanded tail digital content object category 304 and the further expanded tail digital content object geolocation 306. When the fourth cluster of known data 340 contains a sufficient amount of data, the fourth cluster of known data is input into a machine-learning model to generate an electronic bid value for the tail digital content object. It will be appreciated that the process depicted by process 350 continues iteratively until a cluster of known data contains a sufficient amount of data.

FIGS. 4A and 4B illustrate an exemplary electronic bid value generation process for use with embodiments of the present disclosure. In embodiments, process 400 begins with receiving 401 a tail digital content object. In embodiments, receiving 401 the tail digital content object comprises receiving a digital content object and determining that it is a tail digital content object. In embodiments, the receiving of and determining of the tail digital content object are performed by a server 107. In embodiments, the server 107 receives the digital content object and/or the tail digital content object from a digital content object repository 109.

In embodiments, process 400 continues with extracting 402 a tail digital content object geolocation and a tail digital content object category associated with the tail digital content object. In embodiments, extracting 402 the tail digital content object geolocation and the tail digital content object category comprises requesting, by a server 107, that a digital content object repository 109 return a tail digital content object category and a tail digital content object geolocation for the tail digital content object. The request sent by the server 107 to the digital content object repository may comprise an identifier associated with the tail digital content object. The response sent by the digital content object repository 109 to the server may comprise the tail digital content object geolocation and the tail digital content object category along with the identifier associated with the tail digital content object.

In embodiments, process 400 continues with iteratively retrieving 403 known data clusters until a final known data cluster having a final data records count meeting or exceeding a data counts threshold is retrieved. In embodiments, iteratively retrieving 403 known data clusters comprises retrieving, by a server 107 from a digital content object repository 109, a known data cluster associated with a related digital content objects set. In embodiments, each related digital content object of the related digital content objects set is associated with the tail digital content object geolocation and the tail digital content object category. In embodiments, the known data cluster comprises a data records count and a historical digital content object interaction currency value for each related digital content object of the related digital content objects set.

In embodiments, process 400 continues with comparing 404, by the server 107, the data records count to a data records count threshold.

In embodiments, process 400 continues with, upon determining that the data records count is less than the data records count threshold, expanding, by the server, one or more of the tail digital content object category and tail digital content object geolocation. In embodiments, process 400 continues with returning to step 403 to retrieve another known data cluster from the digital content object repository 109.

In embodiments, process 400 continues with, upon determining that the data records count is equal to or greater than the data records count threshold, transforming, by the server 107, the known data cluster into the final known data cluster.

In embodiments, process 400 continues with the server 107 programmatically generating 406, using a machine-learning model, an electronic bid value for the tail digital content object based at least on the digital content object attribute set and all of the historical digital content object interaction currency values of the final known data cluster.

In embodiments, process 400 optionally continues with transmitting 407, by the server 107, the electronic bid value to an electronic auction provider 106.

In embodiments, the server 107 determines whether to expand one or more of the tail digital content object geolocation and the tail digital content object category dynamically using machine-learning.

In embodiments, the data records count is a count of digital content object interactions having digital content object currency values associated therewith.

In embodiments, the tail digital content object is a keyword. In embodiments, the keyword is associated with a digital content object interaction threshold that is based upon a digital content object conversion rate. In embodiments, the digital content object interaction threshold is programmatically generated based at least on known digital content object interactions associated with the keyword within a predetermined network time period.

In embodiments, the machine-learning model is a clustering function. In embodiments, the electronic bid value is for transmission to a search engine marketing electronic auction. In embodiments, the electronic bid value is for transmission to a display network auction.

Additional Implementation Details

Although an example processing system has been described in FIG. 2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

CONCLUSION

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus for adaptively adjusting an electronic bid value for a tail digital content object, the apparatus comprising at least one processor and at least one memory including computer program code, the at least one memory and the computer program code configured to, with the at least one processor, cause the apparatus to:

receive, from a digital content object repository, a training data cluster associated with a training digital content objects set, wherein each training digital content object of the training digital content objects set is associated with a training digital content object geolocation and a training digital content object category;

train a machine-learning model using the training data cluster associated with the training digital content objects set to generate a trained machine-learning model;

receive, from the digital content object repository, the tail digital content object;

extract a tail digital content object geolocation and a tail digital content object category associated with the tail digital content object;

transmit, to the digital content object repository, a first request for a first known data cluster, wherein the first request comprises a first tail digital content object identifier, the tail digital content object geolocation, and the tail digital content object category;

retrieve, from the digital content object repository, the first known data cluster associated with a first related digital content objects set, wherein each related digital content object of the first related digital content objects set is associated with the tail digital content object geolocation and the tail digital content object category, the first known data cluster comprising a data records count and a historical digital content object interaction currency value for each related digital content object of the first related digital content objects set;

compare the data records count to a data records count threshold, wherein the data counts threshold comprises a minimum number of data records for applying the trained machine-learning model to a final known data cluster;

upon determining that the data records count is less than the data records count threshold, expand one or more of the tail digital content object category or tail digital content object geolocation, transmit, to the digital content object repository, a second request for a second known data cluster, wherein the second request comprises a second tail digital content object identifier, and one or more of the expanded tail digital content object category or the expanded tail digital content object geolocation;

retrieve, from the digital content object repository, the second known data cluster associated with a second related digital content objects set, wherein each related digital content object of the second related digital content objects set is associated with one or more of the expanded tail digital content object category or the expanded tail digital content object geolocation;

upon determining that a second data records count of the second known data cluster meets or exceeds the data records count threshold, transform the second known data cluster into the final known data cluster;

programmatically generate, using the trained machine-learning model, an electronic bid value for the tail digital content object based at least in part on all of the historical digital content object interaction currency values of the final known data cluster; and transmit the electronic bid value to a computing device associated with one or more of a search engine provider, a search engine marketing electronic auction or a display network auction.

2. The apparatus of claim 1, wherein the at least one memory and the computer program code are configured to, with the at least one processor, further cause the apparatus to:

determine whether to expand one or more of the tail digital content object geolocation the tail digital content object category dynamically based at least in part on the trained machine-learning model.

3. The apparatus of claim 1, wherein the data records count is a count of digital content object interactions having digital content object currency values associated therewith.

4. The apparatus of claim 1, wherein the tail digital content object is a keyword.

5. The apparatus of claim 4, wherein the keyword is associated with a digital content object interaction threshold that is based upon a digital content object conversion rate.

6. The apparatus of claim 5, wherein the digital content object interaction threshold is programmatically generated based at least on known digital content object interactions associated with the keyword within a predetermined network time period.

7. The apparatus of claim 1, wherein the trained machine-learning model is a clustering function.

8. A system for adaptively adjusting an electronic bid value for a tail digital content object, the system comprising at least one server and at least one repository, the at least one server comprising at least one processor and at least one memory including computer program code, the at least one memory and the computer program code configured to, with the at least one processor, cause the system to:

receive, by the server from the at least one repository, a training data cluster associated with a training digital content objects set, wherein each training digital content object of the training digital content objects set is associated with a training digital content object geolocation and a training digital content object category;

train a machine-learning model using the training data cluster associated with the training digital content objects set to generate a trained machine-learning model;

receive, by the server from the at least one repository, the tail digital content object;

extract, by the server, a tail digital content object geolocation and a tail digital content object category associated with the tail digital content object;

transmit, by the server to the at least one repository, a first request for a first known data cluster, wherein the first request comprises a first tail digital content object identifier, the tail digital content object geolocation, and the tail digital content object category;

retrieve, by the server from the at least one repository, the first known data cluster associated with a first related digital content objects set, wherein each related digital content object of the first related digital content objects set is associated with the tail digital content object geolocation and the tail digital content object category, the first known data cluster comprising a data records count and a historical digital content object interaction currency value for each related digital content object of the first related digital content objects set;

compare, by the server, the data records count to a data records count threshold, wherein the data counts threshold comprises a minimum number of data records for applying the trained machine-learning model to a final known data cluster;

upon determining that the data records count is less than the data records count threshold, expand, by the server, one or more of the tail digital content object category or tail digital content object geolocation, transmit, by the server to the at least one repository, a second request for a second known data cluster, wherein the second request comprises a second tail digital content object identifier, and one or more of the expanded tail digital content object category or the expanded tail digital content object geolocation;

retrieve, by the server from the at least one repository, the second known data cluster associated with a second related digital content objects set, wherein each related digital content object of the second related digital content objects set is associated with one or more of the expanded tail digital content object category or the expanded tail digital content object geolocation;

upon determining that a second data records count of the second known data cluster meets or exceeds the data records count threshold, transform, by the server, the second known data cluster into the final known data cluster;

programmatically generate, by the server and using the trained machine-learning model, an electronic bid value for the tail digital content object based at least in part on all of the historical digital content object interaction currency values of the final known data cluster; and transmit, by the server, the electronic bid value to a computing device associated with one or more of a search engine provider, a search engine marketing electronic auction or a display network auction.

9. The system of claim 8, wherein the at least one memory and the computer program code configured to, with the at least one processor, further cause the system to:

determine, by the server, whether to expand one or more of the tail digital content object geolocation or the tail digital content object category dynamically based at least in part on the trained machine-learning model.

10. The system of claim 8, wherein the data records count is a count of digital content object interactions having digital content object currency values associated therewith.

11. The system of claim 8, wherein the tail digital content object is a keyword.

12. The system of claim 11, wherein the keyword is associated with a digital content object interaction threshold that is based upon a digital content object conversion rate.

13. The system of claim 12, wherein the digital content object interaction threshold is programmatically generated based at least on known digital content object interactions associated with the keyword within a predetermined network time period.

14. The system of claim 8, wherein the trained machine-learning model is a clustering function.

15. A computer implemented method for adaptively adjusting an electronic bid value for a tail digital content object, the method comprising:
    receiving, by a computing entity comprising at least one processor, at least one memory, and a network interface, a training data cluster associated with a training digital content objects set, wherein each training digital content object of the training digital content objects set is associated with a training digital content object geolocation and a training digital content object category;
    training a machine-learning model using the training data cluster associated with the training digital content objects set to generate a trained machine-learning model;
    receiving, by the computing entity, the tail digital content object;
    extracting, by the computing entity, a tail digital content object geolocation and a tail digital content object category associated with the tail digital content object;
    transmitting, by the computing entity, a first request for a first known data cluster, wherein the first request comprises a first tail digital content object identifier, the tail digital content object geolocation, and the tail digital content object category;
    retrieving, by the computing entity, the first known data cluster associated with a first related digital content objects set, wherein each related digital content object of the first related digital content objects set associated with the tail digital content object geolocation and the tail digital content object category, the first known data cluster comprising a data records count and a historical digital content object interaction currency value for each related digital content object of the first related digital content objects set;
    comparing, by the computing entity, the data records count to a data records count threshold, wherein the data counts threshold comprises a minimum number of data records for applying the trained machine-learning model to a final known data cluster;
    upon determining that the data records count is less than the data records count threshold, expanding, by the computing entity, one or more of the tail digital content object category or tail digital content object geolocation,
    transmitting, by the computing entity, a second request for a second known data cluster, wherein the second request comprises a second tail digital content object identifier, and one or more of the expanded tail digital content object category or the expanded tail digital content object geolocation;
    retrieving, by the computing entity, the second known data cluster associated with a second related digital content objects set, wherein each related digital content object of the second related digital content objects set is associated with one or more of the expanded tail digital content object category or the expanded tail digital content object geolocation;
    upon determining that a second data records count of the second known data cluster meets or exceeds the data records count threshold, transforming, by the computing entity, the second known data cluster into the final known data cluster;
    programmatically generating, by the computing entity, using the trained machine-learning model, an electronic bid value for the tail digital content object based at least in part on all of the historical digital content object interaction currency values of the final known data cluster; and
    transmitting by the computing entity, the electronic bid value to a computing device associated with one or more of a search engine provider, a search engine marketing electronic auction, or a display network auction.

16. The method of claim 15, wherein the data records count is a count of digital content object interactions having digital content object currency values associated therewith.

17. The method of claim 15, wherein the tail digital content object is a keyword.

18. The method of claim 17, wherein the keyword is associated with a digital content object interaction threshold that is based upon a digital content object conversion rate.

19. The method of claim 18, wherein the digital content object interaction threshold is programmatically generated based at least on known digital content object interactions associated with the keyword within a predetermined network time period.

* * * * *